United States Patent
Mähling et al.

(10) Patent No.: US 7,709,584 B2
(45) Date of Patent: May 4, 2010

(54) NONODOROUS ETHYLENE HOMOPOLYMERS AND COPOLYMERS HAVING GOOD MECHANICAL PROPERTIES

(75) Inventors: Frank-Olaf Mähling, Mannheim (DE); Andreas Deckers, Flomborn (DE); Gernot Köhler, Meckenheim (DE); Axel Schmitz, Wesseling (DE); Lars Wittkowski, Mannheim (DE); Michael Hoppach, Büttelborn/Worfelden (DE)

(73) Assignee: Basell Polyolefine GmbH, Wesseling (DE)

( * ) Notice: Subject to any disclaimer, the term of this patent is extended or adjusted under 35 U.S.C. 154(b) by 271 days.

(21) Appl. No.: 10/450,774

(22) PCT Filed: Dec. 12, 2001

(86) PCT No.: PCT/EP01/14570

§ 371 (c)(1),
(2), (4) Date: Sep. 24, 2003

(87) PCT Pub. No.: WO02/051885

PCT Pub. Date: Jul. 4, 2002

(65) Prior Publication Data

US 2004/0054097 A1  Mar. 18, 2004

(30) Foreign Application Priority Data

Dec. 22, 2000 (DE) .............................. 100 64 752

(51) Int. Cl.
C08F 2/38 (2006.01)
C08F 110/02 (2006.01)

(52) U.S. Cl. .................. 526/64; 526/208; 526/235; 526/352; 428/35.7; 428/36.9

(58) Field of Classification Search ............... 526/64, 526/208, 352, 235; 428/35.7, 36.9
See application file for complete search history.

(56) References Cited

U.S. PATENT DOCUMENTS

| | | | | |
|---|---|---|---|---|
| 2,870,130 A | * | 1/1959 | Davison et. al. | ............ 528/220 |
| 3,092,614 A | * | 6/1963 | Erdmann et al. | .............. 526/64 |
| 3,317,504 A | | 5/1967 | Kinkel et al. | |
| 3,334,081 A | * | 8/1967 | Madgwick et al. | ............ 526/64 |
| 3,657,211 A | | 4/1972 | Steigerwald et al. | |
| 3,917,577 A | * | 11/1975 | Trieschmann et al. | ......... 526/64 |
| 4,000,357 A | * | 12/1976 | Marano, Jr. | ................. 526/228 |
| 4,076,919 A | * | 2/1978 | Urban et al. | ................... 526/64 |
| 4,135,044 A | | 1/1979 | Beals | |
| 4,175,169 A | | 11/1979 | Beals et al. | |
| 5,376,740 A | | 12/1994 | Pfleger et al. | |
| 6,300,430 B1 | | 10/2001 | Deckers et al. | |
| 6,727,326 B2 | | 4/2004 | Mähling et al. | |
| 6,815,571 B2 | | 11/2004 | Wittkowski et al. | |
| 6,949,611 B2 | | 9/2005 | Wittkowski et al. | |
| 6,951,908 B2 | | 10/2005 | Groos et al. | |
| 2004/0054097 A1 | | 3/2004 | Maehling et al. | |

FOREIGN PATENT DOCUMENTS

| | | |
|---|---|---|
| DE | 1 908 964 | 9/1970 |
| DE | 1908964 | 9/1970 |
| DE | 3308926 | 9/1984 |
| DE | 197 41097 | 3/1999 |
| DE | 19741097 | 3/1999 |
| EP | 449 092 | 10/1991 |
| EP | 449092 | 10/1991 |
| EP | 575 873 | 12/1993 |
| EP | 575873 | 12/1993 |
| EP | 928 797 | 7/1999 |
| EP | 928797 | 7/1999 |
| RO | 75587 | 7/1981 |
| WO | 01/85807 | 11/2001 |
| WO | 02/048214 | 6/2002 |
| WO | 02/051885 | 7/2002 |
| WO | 02/059166 | 8/2002 |

OTHER PUBLICATIONS

Ullmanns Encyklopadie der technischen Chemie, 45$^{th}$ ed. vol. 19/1980,pp. 169-178 (1980).

Ullmanns Encyklopädie der techischen Chemie, 45$^{th}$ Edition, Polyacryl-Verbindungen bis Quecksilber, Band 19, Verlag Chemie, Polyolefine, vol. 19/198, p. 169-178 (1980).

* cited by examiner

*Primary Examiner*—Fred Teskin
(74) *Attorney, Agent, or Firm*—William R. Reid

(57) ABSTRACT

A process for preparing ethylene homopolymers and copolymers in a tubular reactor having two or more polymerization zones at temperatures of between 150° C. and 350° C. and pressures in the range from 500 to 5000 bar, using oxygen as initiator, which comprises using, as molar mass regulator, one or more aliphatic ketones of the formula I,

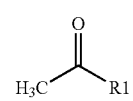

where the variable $R^1$ is a $C_1$-$C_6$-alkyl or $C_3$-$C_{12}$-cycloalkyl, ethylene homopolymers and copolymers obtainable therefrom and their user for producing injection-molded products in the cosmetics, medical and food sectors are described.

8 Claims, No Drawings

NONODOROUS ETHYLENE HOMOPOLYMERS AND COPOLYMERS HAVING GOOD MECHANICAL PROPERTIES

This application is the U.S. national phase of International Application PCT/EP01/14570, filed Dec. 12, 2001, claiming priority to German Patent Application 10064752.9 filed Dec. 22, 2000.

The present invention relates to odorless ethylene homopolymers and copolymers prepared by (co)polymerizing ethylene under high-pressure conditions using an aliphatic ketone as molecular weight regulator, and their use for injection-molding applications in the cosmetics, medical and food sectors.

Ethylene homopolymerization and copolymerization by the high-pressure process is generally known. The reactors used are usually operated continuously at pressures from 150 to 350 MPa and at temperatures from 150° C. to 350° C. with mean residence times from 30 to 180 seconds (Ullmann's Encyclopädie der technischen Chemie [Ullmann's Encyclopedia of Industrial Chemistry], $4^{th}$ edition, Vol. 19/1980/pp. 169-178).

The optical and mechanical properties of the resultant ethylene polymers are dependent, for example, on their molar mass, molar mass distribution, degree of branching, or the type, length and distribution of the branches. Odor and taste of these ethylene polymers result, in contrast, primarily from the presence of impurities or decomposition products of starting materials used in the process. Initiator and/or molar mass regulator can lead, even during polymerization, to by products (dimers, trimers, oligomers and others), which give an unwanted odor or taste.

Particularly when ethylene polymers are used in medicine, cosmetics or the food sector, it is of importance that the polymers not only have a good balance between mechanical and optical properties, but are also taste- and odor-neutral.

The polymer properties are affected, inter alia, by the choice of reactor, for example autoclave or tubular reactor, the temperature, the pressure, the polymerization time or type and concentration of comonomers, initiators or molar mass regulators. To set the suitable molecular weight, substances are used which are termed molecular weight regulators, or regulators for short. Each regulator has a characteristic chain transfer constant, which indicates how effectively a substance acts as chain regulator. In addition, some regulators are incorporated into the polymer chains as comonomer and there lead to additional functional groups.

A frequently used regulator is hydrogen, but this, when air or oxygen is used as free-radical initiator, can lead to the formation of detonating gas, and therefore causes concern for safety reasons. In addition, ethylene can be hydrogenated to ethane by hydrogen.

Other frequently used comonomers or regulators which influence molar mass are carbon monoxide, CO, and hydrocarbons, for example ethane, propane or propene. Carbon monoxide is highly toxic, so that complex safety measures are required when it is used. Gaseous regulators such as ethane, propane and propene also require strict safety rules.

The use of ketones as molecular weight regulators in the production of LDPE is already known. EP-A 0 928 797 proposes a process having at least one autoclave reactor, using carbonyl compounds, for example methyl ethyl ketone or propionaldehyde, as regulator, using which an LDPE is produced containing from 0.1 to 0.5% by weight of carbonyl groups.

DE-A 1 908964 discloses a process by which ethylene homopolymers may be prepared in a high-pressure process. A characteristic of the process described is the use of a peroxide free-radical initiator in the first reaction zone and air in the second reaction zone. Regulators which are recommended are propionaldehyde or methyl ethyl ketone. A high-molecular-weight polyethylene is obtained which is suitable, in particular, for producing highly transparent fine films or resistant packaging films.

U.S. Pat. No. 3,334,081 describes a high-pressure polymerization process having an elevated conversion rate, which is based on feeding ethylene at at least two different points of the reactor. Recommended free-radical initiators are a multiplicity of organic peroxides, and recommended regulators are a multiplicity of organic compounds, preferably ketones, for example methyl ethyl ketone.

U.S. Pat. No. 3,317,504 describes a process for preparing polyethylene by means of a specific temperature profile and the use of molecular weight regulators, inter alia, methyl ethyl ketone.

Rumanian Patent RO 75,587 (priority: 18 Apr., 1979, from CA 96: 200372s) describes the preparation of odorless LDPEs. The regulator used is a mixture of methyl vinyl ketone with propane, ethane and CO, and for starting the reaction a mixture of various organic peroxides is used. However, the use of CO, because of its high toxicity, is a disadvantage, because the pipes and reactor outlet need to be specifically secured against escape of CO.

It is an object of the present invention to prepare ethylene homopolymers and copolymers in a tubular reactor at high conversion rates, which polymers have good organoleptic properties, that is to say are odorless and tasteless, and at the same time have good mechanical and optical properties.

We have found that this object is achieved by a process preparing ethylene homopolymers and copolymers in a tubular reactor having two or more polymerization zones at temperatures from 150° C. to 350° C. and pressures in the range from 500 to 5000 bar, using oxygen as initiator, which comprises using, as molar mass regulator, one or more aliphatic ketones of the formula I

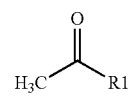

where the variable $R^1$ is a $C_1$-$C_6$-alkyl or $C_3$-$C_{12}$-cycloalkyl.

The variable $R^1$ here is selected from the group consisting of $C_1$-$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$-$C_4$-alkyl such as methyl, ethyl, n-propyl, isopropyl, n-butyl, isobutyl, sec-butyl and tert-butyl;

$C_3$-$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl.

Preferred molar mass regulators are acetone, methyl ethyl ketone "MEK", methyl isobutyl ketone "MIBK" or 2-pentanone, and particularly preferably methyl ethyl ketone.

All of the molar mass regulator can be added to the reaction mixture before entry into the tubular reactor. However, it can also be added together with further polymerization initiator at different points along the tubular reactor. Usually, from 10 to 200 mol of molar mass regulator are used per metric t of polymer, preferably from 20 to 100 mol/metric t.

The polymerization is carried out in a tubular reactor at pressures from 500 to 5000 bar, pressures from 1500 to 3500 bar being preferred, and pressures from 1900 to 3100 bar being particularly preferred. The reaction temperatures are above 40° C. The reaction temperature is from 150° C. to 350° C., preferably from 200° C. to 330° C., and very particularly preferably from 250° C. to 320° C.

The ratio of length to diameter of the tubular reactor is preferably in the range from 10 000 to 50000, particularly preferably from 15 000 to 35 000.

Generally, the mean residence time of the reaction mixture in the tubular reactor is from 30 to 300, in particular from 60 to 180, seconds.

The tubular reactor can be provided, in a customary manner, with a cooled jacket for removing the heat of reaction. Preference here is given to a hot-water jacket, in which case this can also be segmented.

The initiator used is according to the invention oxygen or, for the sake of simplicity, air. The oxygen is customarily used in amounts in the range from 1 to 1000 g/metric t of polyethylene produced, preferably from 5 to 500 g/metric t, and particularly preferably from 20 to 200 g/metric t.

In a preferred embodiment, the tubular reactor has at least two reaction zones into which are added additional cold or preheated monomer and/or cold or preheated comonomer as a fresh gas stream upstream of the start of each reaction zone. Preference is given to from two to four sequential reaction zones, polymerization in each zone being restarted by addition of the initiator. Suitable reactors for the procedure are, inter alia, tubular reactors that are provided with a number of inlet points for the initiator and for feeding further amounts of monomer.

Reactors as described in U.S. Pat. Nos. 4,135,044 and 4,175,169 can also be operated using the inventive process. In this case the tubular reactor has a comparatively smaller tube diameter in each reaction zone from the initiator feed to the temperature maximum, compared with the enlarged tube diameter in the subsequent cooling zone (from the temperature maximum to the next initiator feed). As a result a high conversion rate with relatively small pressure drop can be achieved over the length of the reactor.

The inventive process may be used not only for homopolymerization, but also for copolymerization of ethylene with other monomers, under the precondition that these monomers copolymerize with ethylene in a free-radical manner at high pressure. Examples of suitable copolymerizable monomers are: β-ethylenically unsaturated $C_3$ to $C_8$-carboxylic acids, in particular maleic acid, fumaric acid, itaconic acid, acrylic acid, methacrylic acid and crotonic acid; β-ethylenically unsaturated $C_3$ to $C_{15}$-carboxylic esters or anhydrides, in particular methyl methacrylate, ethyl methacrylate, n-butyl methacrylate or tert-butyl methacrylate, methyl acrylate, ethyl acrylate, n-butyl acrylate, 2-ethylhexyl acrylate, tert-butyl acrylate, methacrylic anhydride, maleic anhydride or itaconic anhydride; and α-olefins, such as propene, 1-butene, 1-pentene, 1-hexene, 1-octene or 1-decene. In addition, vinyl carboxylates, particularly preferably vinyl acetate, can be used as comonomer. The proportion of comonomer or of comonomers in the reaction mixture, based on the amount of ethylene monomer, can be from 0.1 to 45% by weight. Particular preference is given to ethylene homopolymers.

According to the inventive process, ethylene homopolymers and copolymers having particularly favorable properties can be prepared. The inventive ethylene homopolymers have densities from 920 to 935 kg/m³, preferably from 922 to 930 kg/m³, and particularly preferably from 924 to 927 kg/m³. The melt flow index, as specified in ISO 1133 (190° C./2.16 kg), of these ethylene polymers is from 30 to 50 g/10 min, in particular from 36 to 50 g/10 min, and particularly preferably from 40 to 45 g/10 min. This permits thin-walled vessels having wall thicknesses in the range from 0.3 to 0.5 mm to be produced with short injection times.

In addition, the polymers prepared by the inventive process, in particular the ethylene homopolymers, are particularly highly suitable for producing injection-molded products in the cosmetics, medical and food sectors. Injection-molded products that are produced from the inventive ethylene homopolymers have outstanding optical and mechanical properties. Preference is given to plastic moldings, for example bottles, having an elastic modulus from 200 to 400 N/m², preferably from 280 to 350 N/m², and an environmental stress cracking resistance, ESCR, of at least 30 min, preferably at least 50 min, and particularly preferably at least 60 min. The moldings produced, in addition, have a very good surface quality without streaks and flow marks.

In the carton pack sector (TetraPak®, CombiBloc®), the inventive ethylene homopolymers are particularly suitable for producing pouring aids or welded-in closures, and combinations of the two. The entire pack or carton top side containing an integrated closure can also be produced from the inventive ethylene homopolymers.

Whereas the pouring aids and welded-in closures do not generally come into contact with the package contents during storage (aluminum foil sealing layer), the package contents, in the case of the TetraTop pack (carton top side), are in continuous contact with the plastic. The requirements of the material here are correspondingly high with respect to organoleptics, since the package contents (currently generally fruit juices) must not be impaired in odor or taste.

A further field of application for the inventive ethylene homopolymers are lids for composite packs (aluminum-coated cardboard packages), as are used, inter alia, for potato chips, Kaba [drinks powder], children's drinks powders, instant soups, etc. In this use, although the package contents are not directly in contact with the plastic lid during storage, since the pack is usually sealed with an aluminum sealing foil as an oxygen barrier, when the plastic lid is removed, an unpleasant odor is perceived as extremely disturbing, precisely in the case of children's drinks powders and chips packages.

In addition, the inventive ethylene homopolymers are used in Tampax tube applicators. In this case also, when the package is opened, no unpleasant odor should be perceptible.

Not only before, but also after, processing to give plastics moldings, the inventive ethylene homopolymers exhibit very good organoleptic properties. They are classified as odorless by questioned subjects. This is surprising because both the ketones used and, in particular methyl ethyl ketone, and dimers, trimers and similar products have a characteristic and in no way pleasant characteristic odor.

The organoleptic properties may also be determined instrumentally, for example by gas chromatography or differential thermal gravimetry, in which case by separate or sequential measuring instruments the amount and type of escaping volatile compounds are determined. Tests made by teams of testers are of high significance.

The invention was also surprising because the frequently used aldehydes, for example propionaldehyde, lead to polymers which have a characteristic unpleasant odor and are suitable, only after extensive processing, as component for the abovementioned uses. Even after intensive treatment with steam, a weak, but unpleasant odor may still be observed. In addition, by means of the inventive process, conversion rates greater than 25%, typically even >30%, can be achieved.

The invention is described by examples.

EXAMPLES AND COMPARATIVE EXAMPLES

The examples and comparative examples were carried out in a tubular reactor vessel of a length of 560 m and a ratio of length to diameter of 26500. Air was added to the ethylene in the compressor zone and compressed in a plurality of stages to the respective reaction pressure and fed to the inlet points of the tubular reactor.

The heat of reaction released in the polymerization was removed from the reaction mixture via a coolant circuit. The resultant polymer was separated in a customary and known manner from unreacted ethylene and other low-molecular-weight compounds in separators downstream of the reactor and discharged and processed via an extruder and granulator. Unreacted ethylene is purified in a plurality of stages and recirculated to the suction side of the compressors. The details can be taken from Ullmans Encyclopädie der technischen Chemie [Ullmans Encyclopedia of Industrial Chemistry], Volume 19, pp. 169-178 (1980).

The properties of the resultant polymers were determined using the following methods and may be taken from table 1:

The melt flow index (MFI) at a temperature of 190° C. and a pressing force of 2.16 kg as specified by ISO 1133, and the density as specified by ISO 1183.

The polymers were used in a customary and known manner to produce injection-molded specimens which were studied by testers for odor and taste.

Abbreviations used: MEK: methyl ethyl ketone, PA: propionaldehyde, PE: polyethylene.

TABLE 1

Polymerization conditions of examples 1-4 and comparative examples V1-V4.

| No. | Regulator (material) | Initiator type | Yield [kg/h] | Regulator [tPE/h] | Density [g/cm$^3$] | MFI [g/10 min] |
|---|---|---|---|---|---|---|
| 1 | MEK | Air | 20.6 | 2.1 | 0.9256 | 38 |
| 2 | MEK | Air | 19.8 | 2.0 | 0.9260 | 41 |
| 3 | MEK | Air | 22.7 | 2.2 | 0.9261 | 45 |
| 4 | Acetone | Air | 31.4 | 2.0 | 0.9255 | 44 |
| V1 | PA | Air | 8.4 | 2.1 | 0.9257 | 41 |
| V2 | PA | Peroxide | 8.5 | 1.9 | 0.9259 | 52 |
| V3 | PA | Peroxide | 8.2 | 2.0 | 0.9257 | 48 |
| V4 | MEK | Peroxide | 20.5 | 2.0 | 0.9260 | 45 |

Organoleptic Testing of the Polymers

To test the polymers from the above listed examples 1 to 4 and V1 to V4, the samples were each presented to two groups of testers. Tester team 1 consisted of 23 persons without particular training. Tester team 2 consisted of 12 persons who carry out odor and taste tests professionally. The rating was made in each case using scores (1: very good, 2: good, 3: satisfactory, 4: adequate, 5: deficient) and is given in Table 2.

TABLE 2

Organoleptic Testing

| Sample | Tester team 1 | Tester team 2 | Initiator used | Regulator used |
|---|---|---|---|---|
| 1 | 1.5 | 2 | Air | MEK |
| 2 | 1 | 1.5 | Air | MEK |
| 3 | 1 | 1 | Air | MEK |
| 4 | 2 | 2.5 | Air | Acetone |
| V1 | 3.5 | 4 | Air | PA |

TABLE 2-continued

Organoleptic Testing

| Sample | Tester team 1 | Tester team 2 | Initiator used | Regulator used |
|---|---|---|---|---|
| V2 | 4 | 4 | Peroxide | PA |
| V3 | 4 | 4 | Peroxide | PA |
| V4 | 3 | 3 | Peroxide | MEK |

We claim:

1. A process comprising polymerizing ethylene to form ethylene homopolymers in a tubular reactor having two or more polymerization zones at temperatures from 160° C. to 350° C. and pressures in the range from 500 to 5000 bar, with oxygen as an initiator, and a molar mass regulator comprising, one or more aliphatic ketones of the formula I:

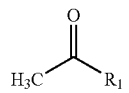

I wherein the variable $R_1$ is a $C_1$-$C_6$ alkyl or $C_3$-$C_{12}$-cycloalkyl in said polymerization zones,
the process having a conversion rate greater than 25%, and the ethylene homopolymers have a density from 920 to 935 kg/m$^3$ and a melt flow index as specified in DIN 53735 (190° C./2.16 kg) from 30 to 50 g/10 min.

2. The process of claim 1, wherein the molar mass regulator is methyl ethyl ketone.

3. A process for producing injection-molded products in the cosmetics, medical and food sectors comprising:
polymerizing ethylene to form ethylene homopolymers in a tubular reactor having two or more polymerization zones at temperatures from 160° C. to 350° C. and pressures in the range from 500 to 5000 bar, with oxygen as an initiator, and a molar mass regulator comprising, one or more aliphatic ketones of the formula I:

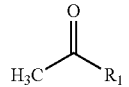

I wherein the variable $R_1$ is a $C_1$-$C_6$ alkyl or $C_3$-$C_{12}$-cycloalkyl in said polymerization zones, the polymerization of ethylene to ethylene homopolymer has a conversion rate greater than 25%, and the ethylene homopolymers have a density from 920 to 935 kg/m$^3$ and a melt flow index as specified in DIN 53735 (190° C./2.16 kg) from 30 to 50 g/10 min; and
injection molding the ethylene homopolymer to form the molded product.

4. The process of claim 3, wherein the injection-molded products are selected from pouring aids, welded-in closures, packaging top sides having an integrated closure, lids for composite packs, or tampon tube applicators.

5. The process of claim 1 wherein 20 to 100 mol of molar mass regulator are used per metric t of polymer.

6. The process of claim 1 wherein the oxygen is in the form of air.

7. The process of claim 1 wherein the oxygen is the sole initiator.

8. The process of claim 1 wherein the conversion rate is greater than 30%.

* * * * *